United States Patent
Ding et al.

(10) Patent No.: US 11,734,274 B2
(45) Date of Patent: Aug. 22, 2023

(54) TRANSFORMING QUERIES USING BITVECTOR AWARE OPTIMIZATION

(71) Applicant: Microsoft Technology Licensing, LLC, Redmond, WA (US)

(72) Inventors: Bailu Ding, Bellevue, WA (US); Vivek Ravindranath Narasayya, Redmond, WA (US); Surajit Chaudhuri, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 71 days.

(21) Appl. No.: 16/917,489

(22) Filed: Jun. 30, 2020

(65) Prior Publication Data
US 2021/0319023 A1 Oct. 14, 2021

Related U.S. Application Data (60) Provisional application No. 63/008,602, filed on Apr. 10, 2020.

(51) Int. Cl.
*G06F 16/2453* (2019.01)
*G06F 16/2455* (2019.01)

(52) U.S. Cl.
CPC .... *G06F 16/24544* (2019.01); *G06F 16/2456* (2019.01)

(58) Field of Classification Search
CPC .......... G06F 16/24544; G06F 16/2453; G06F 16/24537; G06F 16/24542; G06F 16/24545; G06F 16/24561; G06F 16/2456
See application file for complete search history.

(56) References Cited

U.S. PATENT DOCUMENTS

| | | | | |
|---|---|---|---|---|
| 6,032,144 | A * | 2/2000 | Srivastava | G06F 16/24537 |
| 10,824,625 | B1 * | 11/2020 | Hofstetter | G06F 16/24545 |
| 2003/0212701 | A1 * | 11/2003 | Beavin | G06F 16/24544 |
| 2006/0167865 | A1 * | 7/2006 | Andrei | G06F 16/24544 |
| 2006/0282423 | A1 * | 12/2006 | Al-Omari | G06F 16/24544 |
| 2011/0035368 | A1 * | 2/2011 | Cole | G06F 16/24544 |
| | | | | 707/E17.017 |
| 2012/0323885 | A1 * | 12/2012 | Wang | G06F 16/2456 |
| | | | | 707/E17.054 |

(Continued)

OTHER PUBLICATIONS

Andreas Weininger "Efficient Execution of Joins in a Star Schema" p. 542-545 (Year: 2002).*

(Continued)

*Primary Examiner* — Mark D Featherstone
*Assistant Examiner* — Kweku William Halm
(74) *Attorney, Agent, or Firm* — Ray Quinney & Nebeker; Tiffany Healy (57) ABSTRACT the present disclosure relates to systems, methods, and computer-readable media for optimizing and implementing operator trees based on a received query. For example, systems disclosed herein may generate an operator tree based on a received query. The systems described herein may systematically analyze the impact of bitvector filters in optimizing a join order of the operator tree to generate an optimized operator tree. The systems described herein may further implement the bit-vector aware operator tree by providing the optimized operator tree to an execution engine for further processing.

20 Claims, 4 Drawing Sheets

(56) References Cited

U.S. PATENT DOCUMENTS

| | | | | |
|---|---|---|---|---|
| 2015/0278306 | A1* | 10/2015 | Cheng | G06F 16/24545 |
| | | | | 707/714 |
| 2016/0306849 | A1* | 10/2016 | Curino | G06F 16/24542 |
| 2017/0060944 | A1* | 3/2017 | Khayyat | G06F 16/2237 |
| 2017/0147644 | A1* | 5/2017 | Lee | G06F 16/00 |
| 2018/0060389 | A1* | 3/2018 | Hwang | G06F 16/24542 |
| 2018/0096166 | A1* | 4/2018 | Rogers | H04L 63/04 |
| 2018/0165331 | A1* | 6/2018 | Zhang | G06F 16/24545 |

OTHER PUBLICATIONS

Chaudhuri, et al., "A Pay-As-You-Go Framework for Query Execution Feedback", In Proceedings of the VLDB Endowment, vol. 1, Issue 1, Aug. 23, 2008, pp. 1141-1152.

Raasveldt, et al., "DuckDB: An Embeddable Analytical Database", In Proceedings of the International Conference on Management of Data, Jun. 30, 2019, pp. 1981-1984.

"International Search Report & Written Opinion Issued in PCT Application No. PCT/US21/020565", dated Jun. 1, 2021, 11 Pages.

"TPC Benchmark DS—Standard Specification-Version 1.1.0", Retrieved from: https://web.archive.org/web/20130125032653/http://tpc.org/tpcds/spec/tpcds_1.1.0.pdf, Apr. 2012, 161 Pages.

Almeida, et al., "Scalable Bloom Filters", In Journal of Information Processing Letters, vol. 101, Issue 6, Mar. 31, 2007, pp. 255-261.

Antova, et al., "Optimizing Queries over Partitioned Tables in MPP Systems", In Proceedings of the ACM SIGMOD International Conference on Management of Data, Jun. 18, 2014, pp. 373-384.

Astrahan, et al., "System R: Relational Approach to Database Management", In Journal ACM Transactions on Database Systems, vol. 1, Issue 2, Jun. 1, 1976, pp. 97-137.

Beeri, et al., "On the Power of Magic", In Journal of Logic Programming, vol. 10, Issues 3-4, Apr. 1991, pp. 255-299.

Bernstein, et al., "Using Semi-Joins to Solve Relational Queries", In Journal of the Association for Computing Machinery, vol. 28, Issue 1, Jan. 1981, pp. 25-40.

Bloom, Burtonh., "Space/time trade-offs in hash coding with allowable errors", In Communications of ACM, vol. 13, Issue 7, Jul. 1970, pp. 422-426.

Bratbergsengen, Kjell, "Hashzng Hethods and Relational Algebra Operations", In Proceedings of the Tenth International Conference on Very Large Database Conference, Aug. 27, 1984, pp. 323-333.

Chan, et al., "Bitmap Index Design and Evaluation", In Proceedings of the ACM SIGMOD International Conference on Management of Data, Jun. 1998, pp. 355-366.

Chen, et al., "Applying Hash Filters to Improving the Execution of Bushy Trees", In Proceedings of 19th International Conference on Very Large Data Bases, Aug. 24, 1993, pp. 505-516.

Chen, et al., "Interleaving a Join Sequence with Semijoins in Distributed Query Processing", In Journal of IEEE Transactions on Parallel and Distributed Systems, vol. 3, Issue 5, Sep. 1992, pp. 611.621.

Chen, et al., "On Applying Hash Filters to Improving the Execution of Multi-Join Queries", In the Journal of Very Large Data Bases, vol. 6, Issue 2, May 1997, pp. 121-131.

Das, et al., "Query Optimization in Oracle 12c Database In-Memory", In Proceedings of the 41st International Conference on Very Large Data Bases, Aug. 31, 2015, pp. 1770-1781.

Ding, et al., "Bitvector-aware Query Optimization for Decision Support Queries", In Proceedings of the ACM SIGMOD International Conference on Management of Data, Jun. 14, 2020, pp. 2011-2026.

Fan, et al., "Cuckoo Filter: Practically Better Than Bloom", In Proceedings of the 10th ACM International on Conference on emerging Networking Experiments and Technologies, Dec. 2, 2014, pp. 75-87.

Fender, et al., "Effective and Robust Pruning for Top-Down Join Enumeration Algorithms", In Proceedings of IEEE 28th International Conference on Data Engineering, Apr. 1, 2012, pp. 414-425.

Galindo-Legaria, et al., "Optimizing Star Join Queries for Data Warehousing in Microsoft SQL Server", In Proceedings of IEEE 24th International Conference on Data Engineering, Apr. 7, 2008, pp. 1190-1199.

Graefe, Goetz, "Query Evaluation Techniques for Large Databases", In ACM Computing Surveys, vol. 25, No. 2, Jun. 1993, pp. 73-170.

Graefe, Goetz, "The Cascades Framework for Query Optimization", In IEEE Data Engineering Bulletin, vol. 18, Issue 3, Sep. 1995, pp. 19-29.

Graefe, et al., "The Volcano Optimizer Generator: Extensibility and Efficient Search", In Proceedings of the Ninth International Conference on Data Engineering, Apr. 19, 1993, pp. 209-218.

Hsiao, et al., "On Parallel Execution of Multiple Pipelined Hash Joins", In Proceedings of the AAm SIGMOD International Conference on Management of Data, May 24, 1994, pp. 185-196.

Karayannidis, et al., "Processing Star Queries on Hierarchically-Clustered Fact Tables", In Proceedings of the 28th International Conference on Very Large Databases, Aug. 20, 2002, 12 Pages.

Lahiri, et al., "Oracle database in-memory: A dual format in-memory database", In Proceedings of IEEE 31st International Conference on Data Engineering, Apr. 13, 2015, pp. 1253-1258.

Lang, et al., "Performance-Optimal Filtering: Bloom Overtakes Cuckoo at High Throughput", In Proceedings of the VLDB Endowment, vol. 12, Issue 5, Jan. 2019, pp. 502-515.

Leis, et al., "Query optimization through the looking glass, and what we found running the join order benchmark", In the VLDB Journal, vol. 27, Issue 5, Sep. 18, 2017, pp. 643-668.

Moerkotte, et al., "Analysis of Two Existing and One New Dynamic Programming Algorithm for the Generation of Optimal Bushy Join Trees without Cross Products", In Proceedings of the 32nd International Conference on Very Large Data Bases, Sep. 12, 2006, 12 Pages.

Moerkotte, et al., "Dynamic Programming Strikes Back", In Proceedings of the ACM SIGMOD international conference on Management of data, Jun. 9, 2008, pp. 539-552.

Neumann, Thomas, "Query Simplification: Graceful Degradation for Join-order Optimization", In Proceedings of the ACM SIGMOD International Conference on Management of Data, Jun. 29, 2009, pp. 403-414.

Neumann, et al., "Taking the Edge off Cardinality Estimation Errors using Incremental Execution", In Proceedings of 15th Conference of the GI Department Databases and Information Systems, 2013, pp. 73-92.

Ono, et al., "Measuring the Complexity of Join Enumeration in Query Optimization", In Proceedings of the 16th International Conference on Very Large Data Bases, Aug. 13, 1990, pp. 314-325.

Putze, et al., "Cache-, Hash—and Space-Efficient Bloom Filters", In Proceedings of International Workshop on Experimental and Efficient Algorithms, Jun. 6, 2007, 18 Pages.

Seshadri, et al., "Cost-Based Optimization for Magic: Algebra and Implementation", In Proceedings of the ACM SIGMOD International Conference on Management of Data, Jun. 1, 1996, pp. 435-446.

Simmen, et al., "Fundamental Techniques for Order Optimization", In Proceedings of the ACM SIGMOD International Conference on Management of Data, Jun. 1996, pp. 57-67.

Soliman, et al., "Orca: A Modular Query Optimizer Architecture for Big Data", In Proceedings of the ACM SIGMOD International Conference on Management of Data, Jun. 22, 2014, pp. 337-348.

Valduriez, et al., "Join and Semijoin Algorithms for a Multiprocessor Database Machine", In Journal of ACM Transactions on Database Systems, vol. 9, Issue 1, Mar. 23, 1984, pp. 133-161.

Weininger, Andreas, "Efficient Execution of Joins in a Star Schema", In Proceedings of the ACm SIGMOD International Conference on Management of Data, Jun. 4, 2002, pp. 542-545.

Zhu, et al., "Looking Ahead Makes Query Plans Robust: Making the Initial Case with In-Memory Star Schema Data Warehouse Workloads", In Journal of the VLDB Endowment, vol. 10, Issue 8, Apr. 1, 2017, pp. 889-900.

* cited by examiner

TRANSFORMING QUERIES USING BITVECTOR AWARE OPTIMIZATION

CROSS-REFERENCE TO RELATED APPLICATIONS

This application claims the benefit of U.S. Provisional Patent Application Ser. No. 63/008,602, filed Apr. 10, 2020, which is hereby incorporated by reference in its entirety.

BACKGROUND

Recent years have seen a significant rise in the use of computing devices to create, store, and process data. Indeed, tools and applications for maintaining and querying datasets of database systems are becoming more and more common. As databases become larger and more complex, conventional tools and techniques for querying databases have become inefficient and increasingly expensive.

For example, many conventional database systems implement optimization tools for processing and implementing queries. For instance, conventional optimization tools may generate an operator tree including instructions for how to obtain or otherwise retrieve select data from a database that is responsive to a query (e.g., a decision support query). Nevertheless, while optimization tools provide useful features related to accessing or otherwise obtaining data from increasingly complex databases, conventional optimization tools are often inflexible in processing different types of queries. In addition, conventional optimization tools often fail to produce an effective or efficient plan for accessing or otherwise navigating datasets of a database. As a result, conventional database systems often expend considerable processing resources in producing query results.

DETAILED DESCRIPTION

Bitvector filters, including bitmap or hash filters, bloom filters, and variants thereof, may be used to perform probabilistic semi-join reductions to effectively prune out rows and other portions of datasets that fail to qualify one or more join conditions. Because bitvector filters may be implemented with relatively little overhead, these filters are often used in commercial database management systems. In query processing, for example, bitvector filters may be applied to hash join operators. For example, a single bitvector filter may be created at a hash join operator within an operator tree and applied to a lower level of a subplan of the operator tree rooted at a probe side.

While conventional query optimizers apply bitvector filters as part of a post-processing step after generating a query plan (e.g., a query execution plan) having a particular join order (e.g., a determined order of join operators), one or more embodiments described herein provide a query optimization system that considers processing impacts of applying bitvector filters during a stage of optimizing an operator tree. In particular, the query optimization system can consider an impact of applying bitvector filters to join operators of an operator tree while also optimizing a join order of the join operators that make up the operator tree.

In particular, as opposed to conventional systems that may apply bitvector filters as a final post-processing step prior to feeding the operator tree to an input to an execution engine (and after determining a join order), one or more embodiments described herein relate to a query optimization system that considers cost savings (e.g., processor savings) of applying bitvector filters as part of the process of generating an optimized operator tree. In particular, the query optimization system can consider the processing cost of applying bitvector filters in conjunction with determining a structure of the operator tree. In one or more embodiments, the query optimization system may determine a different join order based on a cost of applying the bitvector filter(s) for different join orders and different structures of the operator tree.

As will be discussed in further detail below, the present disclosure relates to a query optimization system for generating and optimizing operator trees to execute in response to receiving a query. For example, in one or more embodiments described herein, a query optimization system may receive a query including identifiers of tables, relations, or other datasets (e.g., of a database including a plurality of datasets) associated with combining or retrieving data from multiple datasets (e.g., tables, relations). Upon passing the query and in accordance with operator conditions specified in the received query, the query optimization system can generate an operator tree including instructions for processing one or more join operators where the operator tree including a structure indicating a join order associated with execution of the query.

In addition to passing the query and generating the operator tree, the query optimization system can generate an optimized operator tree having a lower predicted execution cost than an original operator tree passed and generated based on the received query. In particular, and as will be discussed in further detail below, the query optimization system can apply a number of transformation rules to the operator tree to optimize or otherwise modify a join order based on metrics of cost (e.g., processing impact or cost, execution complexity) for one or more of the operators specified within the query. In modifying the operator tree and determining the specific join order of join operators, the query optimization system can consider bitvector filters applied at different functions to determine an optimized structure and join order for the optimized operator tree.

After generating the optimized operator tree, the query optimization system can provide the optimized operator tree to an execution engine for processing. In one or more embodiments, the query optimization system provides the optimized operator tree without performing additional post-processing actions. For example, in contrast to conventional systems that determine where (e.g., at what operators) to apply bitvector filters after an operator tree has been generated (e.g., where the join order of the operator tree is already determined and finalized), the query optimization system may prevent one or more post-processing actions or transformations to be performed as a result of considering the effect of bitvector filters at respective operators and for the operator tree as a whole when generating the optimized operator tree. Indeed, in one or more embodiments, enabling post-processing steps to be performed at this post-processing stage where the query optimization system has considered bitvector filters may prevent the optimized operator tree from executing property on an execution engine.

The present disclosure provides a number of practical applications that provide benefits and/or solve problems associated with generating and implementing an operator tree in connection with processing a query. For example, by generating a bitvector filter aware operator tree, the query optimization system can create a query plan (e.g., an optimized operator tree) having lower processing costs than conventional systems. Moreover, the query optimization system can generate a less expensive query plan (e.g., a query plan that results in lower utilization of processing resources when executing the query) without significantly increasing costs associated with generating the optimized operator tree itself.

In addition to generally creating optimized operator trees having lower associated costs, features and functionalities of the query optimization system can be applied to a flexible range of queries. For example, in one or more embodiments, the query optimization system can be applied to queries having a star structure and/or snowflake structure to accomplish significant processing savings. Moreover, by systematically analyzing the impact of bitvector filters when optimizing a join order of queries, the query optimization system can apply principles described herein to a range of queries having a wide variety of structures while achieving similar benefits (e.g., arbitrary queries having virtually any query structure).

Moreover, the query optimization system can selectively integrate features and functionality of the query optimization process in existing database systems. For example, while implementing the query optimization system may be performed in a fully integrated process in which all components of a database management system are aware of bitvector filters being used in generating the optimized operator tree, the query optimization system can similarly be implemented within a system or environment in which one or more stages of processing or optimizing the query may not be aware of the optimized query plan. As will be discussed in further detail below, the query optimization system can selectively provide the optimized operator tree (e.g., as an alternate to another generated operator tree using conventional techniques) only where the operator tree is predicted to result in a more efficient querying of a database.

As another example, the query optimization system can selectively disable post-processing steps to prevent one or more components of the query optimization system from applying bitvector filters where bitvector filters have already been applied when creating the optimized operator tree. As a still further example, the query optimization system may simply systematically analyze different variations or alternatives of the operator tree having different join orders and based on different applications of bitvector filters to determine an optimized plan estimated to have a low processing cost relative to alternative operator trees having different join orders and/or for which bitvector filters were not necessarily considered.

As illustrated in the foregoing discussion, the present disclosure utilizes a variety of terms to describe features and advantages of one or more embodiments of the query optimization system described herein. For example, as used herein, a "dataset" may refer to a set of data or a subset of data from a database including multiple datasets. For example, as used herein, a dataset may refer to a set of tables or relations of a database (e.g., a relational database). Indeed, a dataset may refer to any collection of data that may be accessed and processed in accordance with a join operator in response to a query.

As used herein, a "query" may refer to a request or other command(s) including operators for obtaining data from one or more datasets. In one or more embodiments described herein, a query refers to a request in a database aware format indicating how to get select information from one or more datasets. A query may be in a query language interpretable by an interface of a database system. A query may include join operators and conditions (e.g., join conditions) indicating conditions for joining data from one or more datasets. In one or more embodiments described herein, a query refers specifically to a decision support query. The query may refer to star and/or snowflake queries (e.g., queries having a star and/or snowflake structure). Alternatively, queries described herein may refer to other structures or formats of queries.

As used herein, a "join operator" may refer to any operator indicating how two or more datasets may be joined together. For example, a join operator may include instructions for joining data from datasets having specific data structures (e.g., tables, columns, or rows of data). In one or more embodiments described herein, join conditions may additionally be used to limit quantities of data or indicate subsets of data that should be combined in accordance with a given join operator.

As used herein, a "bitvector filter" may refer to a data object indicating a subset of data from a dataset. For example, in one or more embodiments described herein, a bitvector filter may refer to an array or other data structure including values that indicate a subset of data from a dataset that satisfies a join condition. For example, the bitvector filter may include an array or vector of 0s and 1s indicating rows or specific values of a dataset that satisfy a given join condition. The bitvector filter may be applied to a dataset to limit analysis of the dataset to those values within the dataset indicated by the bitvector filter in implementing a join operator on a given dataset.

As used herein, an "operator tree" or "query plan" may refer interchangeably to information or instructions associated with how an execution engine may execute a given query. For example, and as will be described in further detail below, an operator tree may refer to an action plan corresponding to a structure of join operators. The operator tree may indicate a corresponding join order. The operator tree may have a format or language that is usable by an execution engine to execute or otherwise process a given query. As will be discussed below, the operator tree may include each of the query operators and/or query conditions indicated by the query. In addition, in one or more implementations, the operator tree incorporates one or more bitvector filters that may be applied at various levels of the operator tree in accordance with one or more embodiments described herein.

Figure 1:
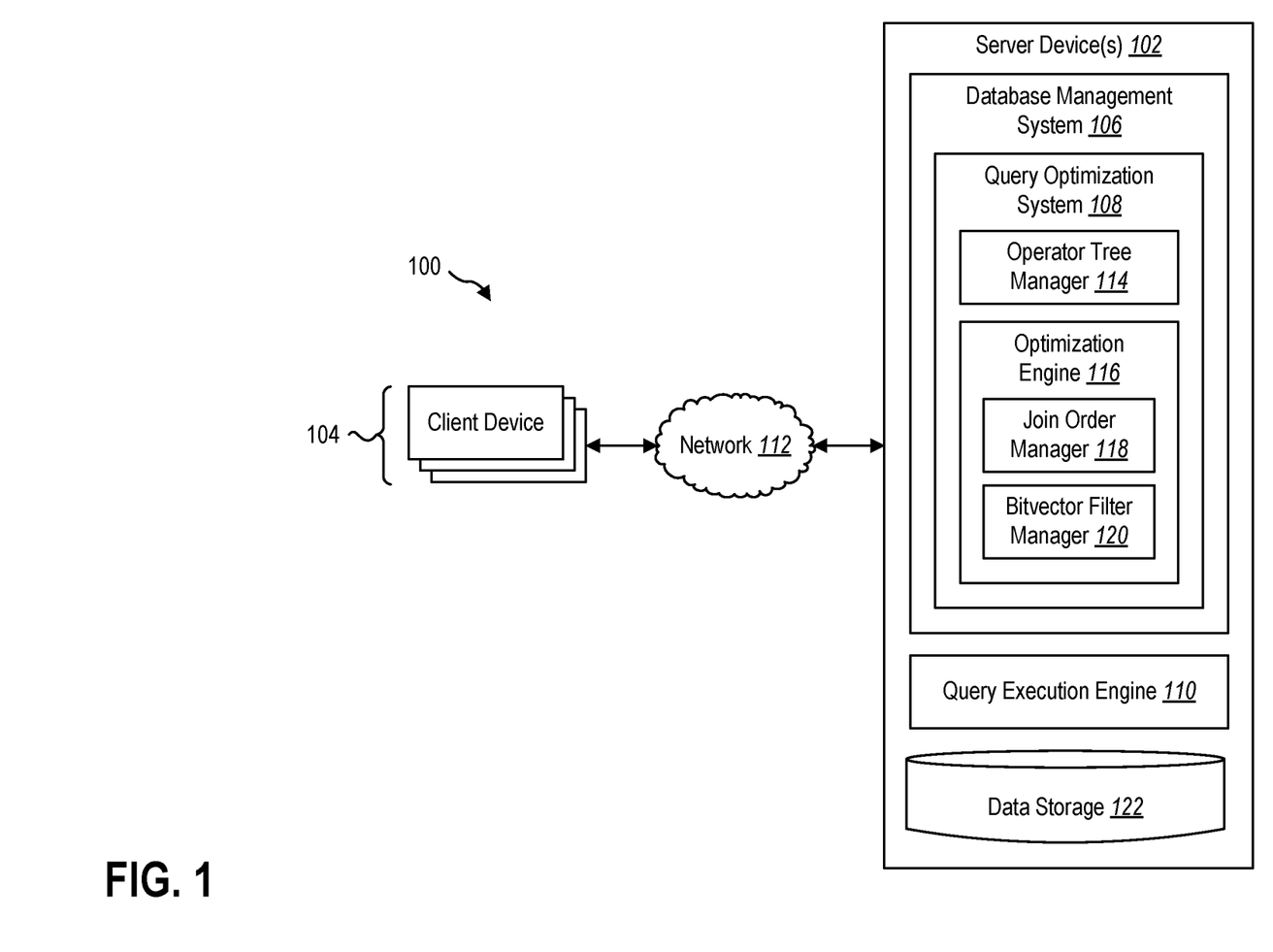
FIG. 1 illustrates an example environment including a query optimization system in accordance with one or more embodiments.

Additional detail will now be provided regarding a query optimization system for generating and implementing an operator tree responsive to receiving a query (e.g., from a client). For example, FIG. 1 illustrates an example environment 100 including one or more server devices 102 and one or more client devices 104. As shown in FIG. 1, the server device(s) 102 includes a database management system 106. The database management system 106 may include a query optimization system 108 and a query execution engine 110. As will be discussed further, the query optimization system 108 may generate and optimize an operator tree based on a received query. Further, the query execution engine 110 may process an operator tree in accordance with a query plan defined by the operator tree (e.g., an optimized operator tree in which bitvector filters have been applied while determining a join order and otherwise optimizing the operator tree).

As shown in FIG. 1, the server device(s) 102 and a plurality of client devices 104 (e.g., hardware and/or software clients) can communicate with each other directly or indirectly through a network 112. The network 112 may include one or multiple networks and may use one or more communication platforms or technologies for transmitting data. The network 112 may refer to any data link that enables transport of electronic data between devices and/or modules of the example environment 100 shown in FIG. 1. The network 112 may refer to a hardwired network (e.g., where a client accesses the database management system directly), a wireless network (e.g., where the client devices communicate with the server device(s) over a wireless network), or a combination of hardwired and wireless networks. In one or more embodiments, the network includes the Internet.

The client devices 104 and/or the server device(s) 102 may refer to various types of computing devices. As an example, one or more of the client devices 104 may include a mobile device, such as a mobile telephone, a smartphone, a PDA, a tablet, or a laptop. Additionally, or alternatively, one or more of the client devices 104 may include a non-mobile device such as a desktop computer, server device, or other non-portable device(s). Each of the client devices 104 and the server device(s) 102 may include features and functionality described below in connection with an example computing device illustrated in FIG. 4.

As will be discussed in further detail below, the database management system 106 may include features and functionality that enable users associated with the client devices 104 to submit queries to the database management system 106 for processing and for selectively accessing data in accordance with operators indicated within respective queries. For example, the database management system 106 may receive a query from a client device (e.g., via the network 112). The query may include operators and conditions indicating characteristics and other conditions of data from various datasets that satisfy criteria of the query. The query may refer to a decision support query and indicate specifics of a request from a client device for a subset of data from a database including any number of datasets (e.g., tables, columns, rows of data).

In one or more embodiments, the client device submits a query having a particular format or vocabulary that the database management system 106 is equipped to understand. For example, a user of the client device may enter a query having a query language format that the database management system 106 can receive and interpret. In one or more embodiments, the user of the client device interacts with selectable options on a graphical user interface using an application on the client device(s) and/or database management system 106 that is aware of particulars of the database and which enables a user to indicate operators and/or join conditions in creating a query for transmission to the database management system 106.

After receiving a query, the database management system 106 may include a number of components capable of processing the query in accordance with one or more embodiments described herein. For example, as mentioned above, and as shown in FIG. 1, the database management system 106 may include a query optimization system having an operator tree manager 114 and an optimization engine 116 implemented thereon.

As will be discussed further in connection with FIG. 2, the operator tree manager 114 may pass a query. For example, the operator tree manager 114 may pass the query upon determining that the query is in a form that can be interpreted by the database management system 106 (e.g., the operator tree manager 114 may verify that the query has a compatible format for processing). In addition to passing the query, the operator tree manager 114 may generate an initial operator tree based on the input query. The initial operator tree may include an operator tree in a format or having particular structure indicated by the query. Alternatively, the initial operator tree may simply refer to a first operator tree generated by the query optimization system 108 based on an input query.

Upon generating the operator tree, the query optimization system 108 can provide the operator tree for optimization to an optimization engine 116. The optimization engine 116 may refer to a bitvector filter aware engine that applies any number of transformation rules to the operator tree in order to generate an optimized query plan that considers bitvector filters in determining an optimal join order for executing the operators that make up the operator tree.

For example, as shown in FIG. 1, the optimization engine 116 may implement a join order manager 118 and a bitvector filter manager 120 to systematically analyze costs associated with executing different iterations of the operator tree to generate a modified operator tree in which a join order and application of one or more bitvector filters are considered in arriving at an optimized operator tree. In particular, as will be discussed in further detail below, the optimization engine 116 may systematically analyze impacts associated with applying bitvector filters on different iterations of alternative operator trees to determine an optimized tree having an optimal join order and application of bitvector filters. Additional information in connection with transformation rules that may be applied to the operator tree are discussed in further detail below.

After generating an optimized operator tree, the optimization engine 116 can provide the optimized operator tree to the query execution engine 110 for further processing. For example, in one or more embodiments, the optimization engine 116 provides the optimized bitvector filter aware operator tree to the query execution engine 110 to execute the query in accordance with the query plan indicated by the optimized operator tree.

In one or more embodiments, the query execution engine 110 executes the query plan without performing (or having the optimization engine 116 perform) additional post-processing steps on the operator tree. For example, where the optimization engine 116 may conventionally apply a subset of post-transformation rules related to applying bitvector filters to an operator tree (e.g., an operator tree where impact of applying bitvector filters have not been considered in determining a particular join order), the optimization engine 116 may instead recognize that the bit-vector filters have been applied in optimizing the join order of the operator tree and simply provide the optimized operator tree to the query execution engine 110 for further processing (e.g., executing the query in accordance with the operator tree).

As shown in FIG. 1, the database management system 106 additionally includes a data storage 122. The data storage may include any data used by any of the components of the database management system 106 in performing features and functionality described herein. For example, the data storage 122 may include datasets of a database system (e.g., a commercial database system). In addition, the data storage 122 may include models for determining transformation actions to perform on various operator trees. For example, the data storage 122 may include a storage of algorithms described herein for transforming a query plan in accordance with one or more embodiments described herein. The data storage 122 may be implemented on the server device(s) 102, as shown in FIG. 1. Alternatively, some or all of the data from the data storage 122 may be accessible via other computing or server devices.

Additional detail in connection with an example implementation of the database management system 106 is discussed in connection with FIG. 2. For example, FIG. 2 illustrates an example workflow 200 indicating a process for receiving and processing a query to generate a query output in accordance with one or more embodiments described herein. As shown in FIG. 2, the operator tree manager 114 may receive a query 202 including operators and one or more operating conditions.

As mentioned above, the operator tree manager 114 may provide an initial operator tree 204 to the optimization engine 116 for further processing. As mentioned above, and as shown in FIG. 2, the optimization engine 116 may include a join order manager 118 and a bitvector filter manager 120. The join order manager 118 and the bitvector filter manager 120 may cooperatively determine an optimized query plan including a join order and bitvector filters applied at respective join operators. The optimization engine 116 may generate and provide an optimized operator tree 206 including a join order and bitvector filters applied to join operators of the tree to the query execution engine 110.

The query execution engine 110 may execute the query in accordance with the optimized query plan. As shown in FIG. 2, the query execution engine 110 may generate a query output 208 responsive to the query 202 and executed or otherwise processed in accordance with the optimized bitvector-aware query plan generated by the optimization engine 116.

Figure 2:
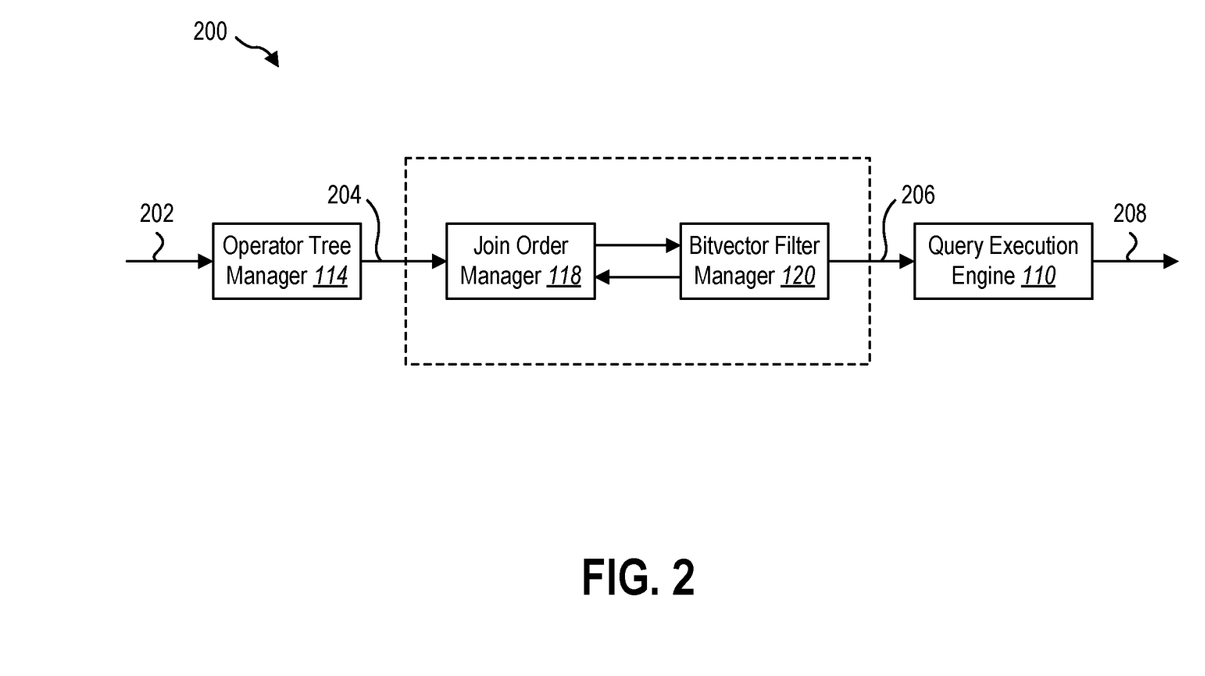
FIG. 2 illustrates an example workflow for generating and implementing an optimized operator tree in accordance with one or more embodiments.

While FIG. 2 illustrates an example workflow 202 illustrating a general description of an example process for receiving a query and generating an optimized query plan in accordance with one or more embodiments described herein, additional detail will now be given in connection with example implementations in accordance with one or more embodiments described herein. Moreover, additional information in connection with generating and implementing an optimized query plan is provided in Provisional Application No. 63/008,602, which has been incorporated herein in its entirety. As noted above, the query optimization system 108 may consider bitvector filters in performing query optimization. For example, in one or more embodiments, the query optimization system 108 systematically analyzes the impact of bitvector filters in optimizing a join order of star and snowflake queries with primary-key-foreign-key (PKFK) joins. This is performed in the plan space of right deep trees without cross products.

While star and snowflake queries are common patterns for decision support queries, in practice, join graphs may include multiple fact tables and non-PKFK joins. In one or more embodiments, the query optimization system 108 implements an algorithm that optimizes a join order for arbitrary decision support queries modified by the systematic analysis of the impact of bitvector filters. For example, in one or more implementations, the query may refer to a decision support query for joining multiple fact tables where none of the joins are PKFK joins. As another example, there can be join conditions between dimension tables or branches where the bitvector filters created from the dimension table may not be pushed down to the fact table. As a further example, there can be dimension tables or branches that are larger than the fact table after predicate filters, where the fact table should be on the build side in the plan space of right deep trees. In each of the above example, the query optimization system 108 can utilize features related to systematically analyzing alternative query plans using bitvector awareness and identifying an optimal operator tree for arbitrary structures of queries.

Since creating and applying bitvector filters can add overhead, the query optimization system 108 further optimizes the algorithm(s) described herein by selectively adding bitvector filters based on estimated benefits. The query optimization system 108 may implement features and functionality exclusive to specific classes of queries. Alternatively, the query optimization system 108 may implement features and functionalities described herein to other queries generally.

In one or more embodiments, an algorithm for optimizing a join order may be used to transform a query plan. For example, the algorithm may be used as a new transformation rule in an existing set of transformation rules (e.g., Volcano/Cascades query optimization framework). In one or more embodiments, the algorithms described herein may be used based on detecting a snowflake or star graph.

The query optimization system 108 may implement a variety of integrations depending on how the underlying optimizer accounts for the impact of bitvector filters. As a first example, the query optimization system 108 may perform a full integration option. In this option, if the underlying set of transformation rules (e.g., Volcano/Cascades query optimization framework) can correctly account for placement and costing of bitvector filters during query optimization, the query optimization system 108 may implement a new transformation rule that transparently integrates into the query optimization framework as any of the existing transformation rules. Accordingly, the query optimization system 108 can perform a full integration where the optimization engine understands that the transformation rule accounts for the effect of a bitvector filter in determining cost of transformation.

As another example, the query optimization system 108 may perform an alternative-plan integration option. In this option, if the query optimization system can account for placement and costing of bitvector filters in a final plan after query optimization (e.g., as part of a post-processing stage), the query optimization system 108 may implement a new transformation rule that can be used as an alternative plan. For example, the query optimization system 108 can compare the optimized query plan with an optimal plan produced by conventional query optimization techniques. The query optimization system 108 may select the query plan that is most optimized (e.g., that has the lowest cost of execution) and provide the selected query plan to the query execution engine 110.

As another example, the query optimization system 108 may perform a shallow integration option. In this option, the query optimization system 108 can simply disable join reordering operations after transformation of the operator tree to the optimized operator tree. In this way, the query optimization system 108 may prevent existing transformation rules from inadvertently rendering the operator tree suboptimal or otherwise non-optimized.

The query optimization system 108 may implement any of the above options in a commercial database as a transformation rule. The commercial database may utilize a cost-based set of transformation rules (e.g., a Volcano/Cascades style query optimizer). Starting from an initial query plan, the query optimization system 108 may detect various patterns in the plan (e.g., a snowflake pattern, star pattern) and apply corresponding transformation rules (e.g., based on the detected patterns). The query optimization system 108 may leverage the pattern detection (e.g., snowflake detection) and transform the corresponding subplan(s).

The query optimization system may implement a shallow integration, where join reordering is disabled on the transformed subplan. The subplan may be subject to other transformations in the commercial database. The query optimization system 108 may use original cardinality estimation and cost modeling in the commercial database, and the selectivity of a bitvector filter is estimated the same as the existing semi join operator. The optimized tree is chosen with existing cost-based optimization framework.

As mentioned above, the query optimization system 108 can systematically analyze the impact of bitvector filters on optimizing the join order of star and snowflake queries with PKFK joins in the plan space of right deep trees without cross products. Conventional techniques for optimizing queries may not specifically analyze interactions between bitvector filters and query optimization for a broad range of decision support queries and a general search space.

In addition, in one or more embodiments, the query optimization system can implement an algorithm that optimizes the join order for arbitrary decision support queries (e.g., queries having arbitrary structures in addition to star and snowflake queries) motivated by the systematic analysis. Since creating and applying bitvector filters adds overhead, the query optimization system 108 can further optimize the algorithm by selectively adding bitvector filters based on estimated benefits. While the algorithms described herein may be optimal for certain classes of decision support queries (e.g., snowflake and star-shaped queries), features and functionalities described herein may similarly apply to other classes of join graphs.

Moreover, the query optimization system can transform a query plan by optimizing the join order with the underlying join graph. Thus, algorithm(s) described herein can be used as a new transformation rule in conjunction with an existing set of transformation rules or existing optimization framework upon detecting a snowflake graph (e.g., subgraph). As discussed above, the query optimization system may perform a variety of integration options (e.g., full integration, alternative integration, shallow integration).

As mentioned above, the query optimization system 108 can utilize features and principles described herein to determine an optimized query plan for executing or otherwise optimizing a query having a snowflake shape. As an example, the query optimization system 108 can use an algorithm with simple heuristics to construct a join order for an arbitrary snowflake query with a single fact table. The query optimization system 108 can leverage candidate plans of minimal cost.

To illustrate, in optimizing the query plan, the query optimization system 108 can assign priorities to branches based on violations of a snowflake pattern and sort them in descending order by priorities. If the bitvector filters created from dimension tables are all pushed down to the fact table except for one, the corresponding dimension table either joins with another dimension table or is not on the build side. In addition, since this dimension table does not create a bitvector filter that pushes down to the fact table, joining this dimension table early with the fact table can eliminate the unnecessary tuples that do not qualify the join conditions early in the plan.

More specifically, the query optimization system 108 can assign priorities to branches for snowflake queries with a number of heuristics. For example, a first group of (group P0) may refer to relations that do not have join conditions or PKFK joins with the fact table, which can happen when joining multiple fact tables. A second group (group P1) may refer to branches that do not join with any other branches, which may be joined with the fact table before joining the branches in group P0. A third group (group P2) may refer to branches with join conditions, which may include branches joined consecutively in the right deep tree to allow pushing down bitvector filters created by these branches (within a set of connected branches, these branches can be joined with descending selectivity on the fact table or, across sets of connected branches, larger sets of numbers of connected branches). A fourth group (group P3) may refer to branches that are larger than the fact table. Since it would be suboptimal to put these branches on the build side, the query optimization system 108 can reorder the build and probe sides. Joining these branches early may allow pushing down the bitvector filters created from the fact table. The branches in this group may be ordered with descending selectivity on the fact table.

The candidate plan may be constructed by two cases. If a fact table ($R_0$) is the right most leaf, the query optimization system 108 can join all the branches with the fact table. Otherwise, for each branch, the query optimization system 108 can optimize the branch by analyzing a subproblem of a plan space of right deep trees without cross products for a branch in a snowflake. The query optimization system 108 can join the remaining branches to complete the plan and update the best plan if the estimated cost of the new plan is lower.

An example algorithm that may be employed by the query optimization system 108 in generating an optimized plan for a snowflake query with a single fact table is shown below:

```
OptimizeSnowflake(G):
    | Input: Join graph G
    | Output: Query plan plan
 1  | B ← SortedBranches(G.Branches)
 2  | best → JoinBranches(B,G.Fact,∅)
 3  | foreach branch b in B do
 4  |    | p ← Join(OptimizeChain(b,G.Fact), G.Fact)
 5  |    | p ← JoinBranches(B \ b, G.Fact,p)
 6  |    | If best.Coat > p.Coat then best ← p
 7  | end
 8  | return best
JoinBranches(B, f, p):
    | Input: A act of ordered branches B, fact table f, inital plan p
    | Output: A query plan p'
 9  | p' ← p
10  | foreach branch b in B do
```

```
11  |   |  foreach table t in b do
12  |   |   |  If t.Card > f.Card then p' ← Join(p', t)
13  |   |   |  else p' ← Join(t, p')
14  |   |  end
15  |  end
16  |  return p'
   SortBranches(G):
   |  Input: Join graph G
   |  Output: Sorted branches sortedBranches
17  |  groups ← GroupBranches(G)
18  |  sortedG ← SortBySizeDesc(groups)
19  |  priority ← [ ]
20  |  for i = 0;i < group.Count( );i + + do
21  |   |  If sortedG[i].Size > 1 then priority[i] ← i + 1
22  |   |  else
23  |   |   |  If IsNonUnipueKeyJoin(g[0], f) then priority[i] ← g[0].Selectivity
24  |   |   |  If g[0].Card < f.Card then priority[i] ← 1
25  |   |   |  else priority[i] ← |G| + 1 + g[0].Selectivity
26  |   |  end
27  |  end
28  |  sortedG ← SortByPriorityDesc(groups,priority)
29  |  sortedBranches ← [ ]
30  |  foreach group in sortedG do
31  |   |  branches ← SortBySelectivityDesc(group)
32  |   |  foreach b in branches do
33  |   |   |  sortedBranches.Add(b)
34  |   |  end
35  |  end
36  |  return sortedBranches
```

As another example, in addition to snowflakes with a single fact table, the query optimization system 108 can utilize features described herein to optimize a query plan for queries having multiple fact tables. The query optimization system 108 can further extend the analysis above related to the single fact table snowflake query to arbitrary join graphs by iteratively extracting and optimizing snowflake join graphs. For example, the query optimization system 108 can produce a join order for a join graph by alternative two stages iteratively. In particular, in a snowflake extraction stage, a snowflake subgraph may be extracted from a join graph by identifying a single fact table and its related dimension tables, potentially with non-PKFK joins. In the snowflake optimization stage, the query optimization system 108 can use the algorithm above (in connection with the single fact table snowflake query) to produce a join order for the extracted subgraph. The resulting snowflake may be marked as optimized and considered as a new relation to the updated join graph. The query optimization system 108 may alternate the two stages until the full join graph is optimized.

More specifically, when extracting a snowflake, the query optimization system 108 can consider a relation as a fact table if it does not join with any other table where the join predicate is an equi-join on its key columns. Among all the unoptimized fact tables, the query optimization system 108 can find one with the smallest cardinality and expand from this table recursively to include all related dimension relations. Where there is only one fact table in the snowflake (G), the query optimization system 108 can simply return to the original join graph.

An example algorithm that may serve as an extension to the algorithm discussed above in generating an optimized plan for a snowflake query with multiple fact tables is shown below:

```
   OptimizeJoinGraph(G):
   |  Imput: Join graph G
   |  Output: Query plan plan
1  |  while |G| > 1 do
2  |   |  G' ← ExtractSnowflake(G)
3  |   |  p ← OptimizeSnowflake(G')
4  |   |  G ← UpdateJoinGraph(G,G')
5  |   |  plan ← UpdateQueryPlan(plan,p)
6  |  end
7  |  return plan
   ExtractSnowflake(G):
   |  Input: Join graph G
   |  Output: Snowflake G'
8  |  n ← 0
9  |  $G_{sorted}$ ← SortByCardinalityAsc(G)
10 |  foreach g in $G_{sorted}$ do
11 |   |  If g is an unoptimized fact table then
12 |   |   |  If n == 0 then
13 |   |   |   |  G' ← ExpandSnowflake(g)
14 |   |  end
15 |   |  n ← n + 1
16 |   |  end
17 |  end
18 |  If n == 1 then G' ← G
19 |  return G'
```

Figure 3:
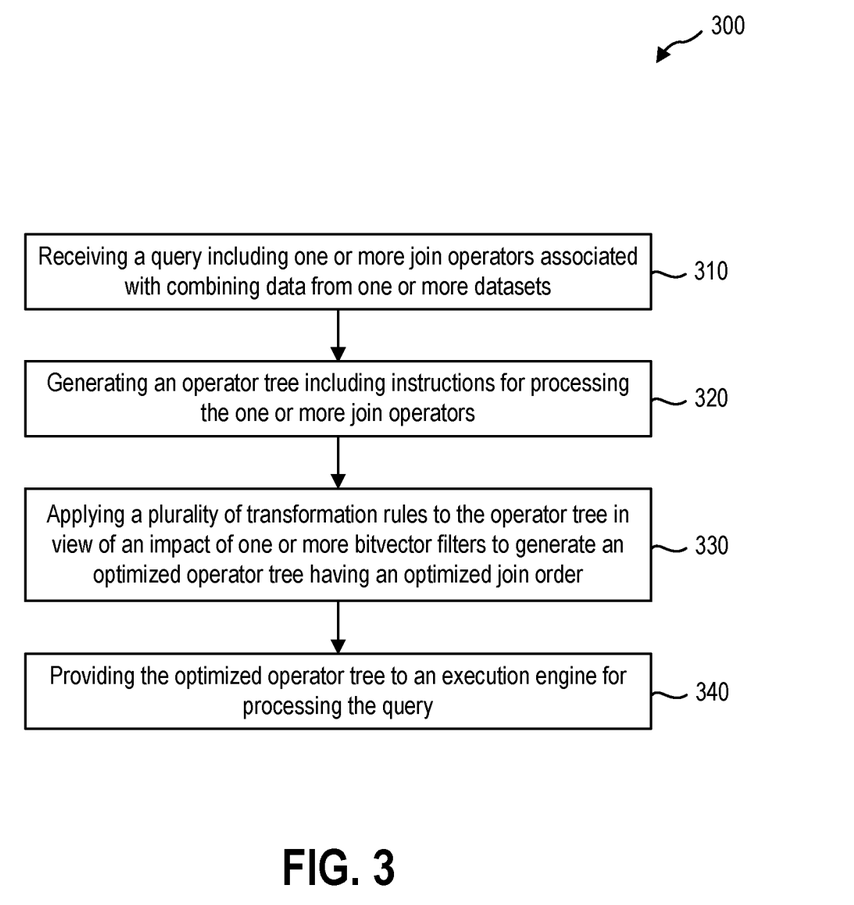
FIG. 3 illustrates an example series of acts for generating and implementing an optimized operator tree in accordance with one or more embodiments.

Turning now to FIG. 3, this figure illustrates an example flowchart including a series of acts for generating and implementing an optimized operator tree for use in processing queries in accordance with one or more embodiments described herein. While FIG. 3 illustrates acts according to one or more embodiments, alternative embodiments may omit, add to, reorder, and/or modify any of the acts shown in FIG. 3. The acts of FIG. 3 can be performed as part of a method. Alternatively, a non-transitory computer-readable medium can include instructions that, when executed by one or more processors, cause a computing device to perform the acts of FIG. 3. In still further embodiments, a system can perform the acts of FIG. 3.

For example, FIG. 3 illustrates a series of acts 300 for generating and implementing an optimized operator tree in accordance with one or more embodiments. The series of acts 300 includes an act 310 of receiving a query including one or more join operators associated with combining data from one or more datasets. For example, the act 310 may involve receiving a query including identifiers of datasets and one or more join operators associated with combining data from the datasets.

In one or more embodiments, the one or more join operators include a hash join having instructions for joining two or more datasets from a database including a plurality of datasets identified by the query. In one or more implementations, the one or more join operators include a merge join having instructions for combining and sorting values from two or more datasets from a database including a plurality of datasets identified by the query. In one or more implementations, the one or more join operators include a nested loop join having instructions for using a nested loop to join two or more datasets from a database including a plurality of datasets identified by the query.

As further shown, the series of acts 300 includes an act 320 of generating an operator tree including instructions for processing the one or more join operators. For example, the act 320 may involve generating an operator tree including instructions for processing the one or more join operators, the operator tree including a structure indicating a join order associated with execution the query.

In one or more embodiments, a structure of the optimized operator tree includes a modified join order generated for an arbitrary query. In one or more implementations, the query includes one or more of a star query structure or a snowflake query structure. In one or more implementations, the structure of the optimized operator tree includes the modified join order of the star query structure or the snowflake query structure with primary-key-foreign-key (PKFK) joins in a plan space of right deep trees without cross products.

As further shown, the series of acts 300 includes an act 330 of applying a plurality of transformation rules to the operator tree in view of an impact of one or more bitvector filters to generate an optimized operator tree having an optimized join order. For example, the act 330 may include applying a plurality of transformation rules to the operator tree to generate an optimized operator tree, the plurality of transformation rules including a modified join order based on processing savings associated with applying one or more bitvector filters to the one or more join operators. In one or more embodiments, the bitvector filters include one or more of a hash filter, a bloom filter, or variants thereof.

In one or more embodiments, applying the plurality of transformation rules includes considering the one or more bitvector filters while applying the plurality of transformation rules. For example, in one or more implementations, applying the plurality of transformation rules comprises adding bitvectors to the operator tree during a query optimization process that includes generating the optimized operator tree.

As further shown, the series of acts 300 includes an act 340 of providing the optimized operator tree to an execution engine for processing the query. For example, the act 340 may involve providing the optimized operator tree to an execution engine for processing the query in accordance with the optimized operator tree.

In one or more embodiments, the series of acts 300 includes applying the plurality of transformation rules to the operator tree independent of a determined structure of the query. For example, the series of acts 300 may be performed independent of whether a structure of the query has a star query structure, a snowflake query structure, or any arbitrary query structure.

In one or more embodiments, the series of acts 300 includes generating an additional operator tree including additional instructions for processing the one or more join operators wherein the additional operator tree has a structure indicating an alternative join order associated with execution of the query. In one or more implementations, providing the optimized operator tree to the execution engine is based on a comparison of a cost of executing the optimized operator tree and the additional operator tree.

In one or more implementations, applying the plurality of transformation rules to the operator tree includes systematically analyzing impacts associated with applying the one or more bitvector filters to a plurality of alternative join orders to determine the modified join order of the one or more join operators having an optimized impact associated with applying the one or more bitvector filters to the one or more join order relative to one or more additional join orders from the plurality of alternative join orders. In one or more embodiments, applying the plurality of transformation rules to the operator tree includes selectively adding bitvector filters to a subset of join operators on the operator tree based on estimated benefits of adding the respective bitvector filters.

Figure 4:
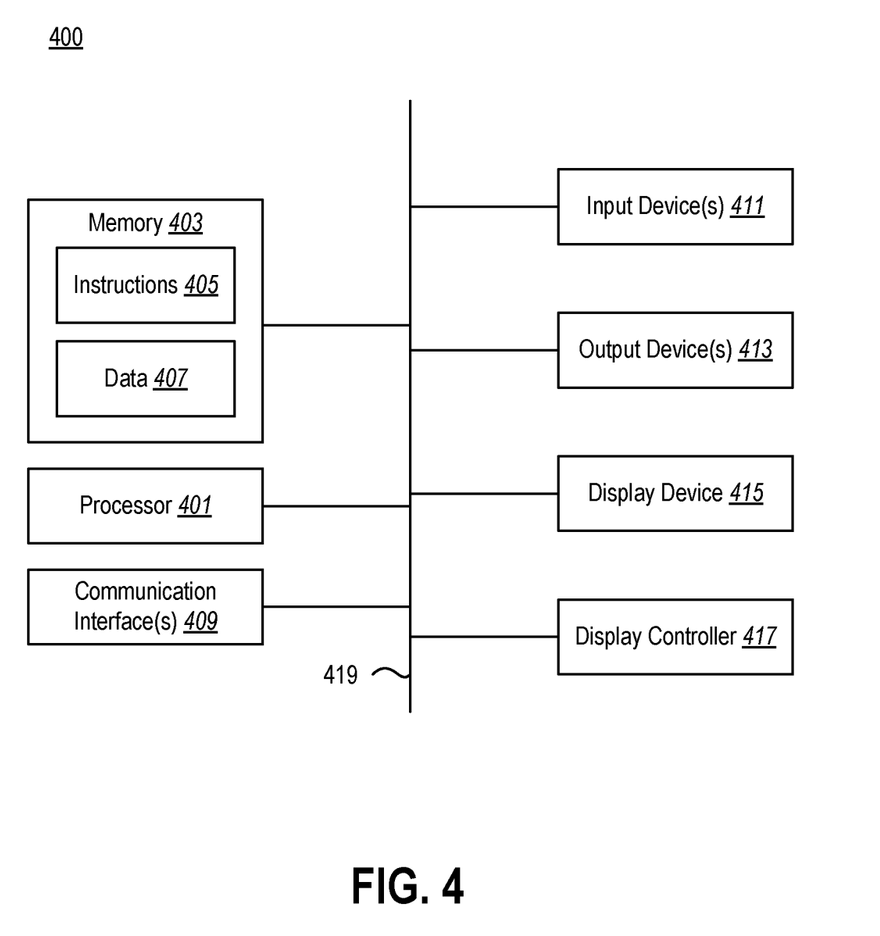
FIG. 4 illustrates certain components that may be included within a computer system.

FIG. 4 illustrates certain components that may be included within a computer system 400. One or more computer systems 400 may be used to implement the various devices, components, and systems described herein.

The computer system 400 includes a processor 401. The processor 401 may be a general-purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 401 may be referred to as a central processing unit (CPU). Although just a single processor 401 is shown in the computer system 400 of FIG. 4, in an alternative configuration, a combination of processors (e.g., an ARM and DSP) could be used.

The computer system 400 also includes memory 403 in electronic communication with the processor 401. The memory 403 may be any electronic component capable of storing electronic information. For example, the memory 403 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 405 and data 407 may be stored in the memory 403. The instructions 405 may be executable by the processor 401 to implement some or all of the functionality disclosed herein. Executing the instructions 405 may involve the use of the data 407 that is stored in the memory 403. Any of the various examples of modules and components described herein may be implemented, partially or wholly, as instructions 405 stored in memory 403 and executed by the processor 401. Any of the various examples of data described herein may be among the data 407 that is stored in memory 403 and used during execution of the instructions 405 by the processor 401.

A computer system 400 may also include one or more communication interfaces 409 for communicating with other electronic devices. The communication interface(s) 409 may be based on wired communication technology, wireless communication technology, or both. Some examples of communication interfaces 409 include a Universal Serial Bus (USB), an Ethernet adapter, a wireless adapter that operates in accordance with an Institute of Electrical and Electronics Engineers (IEEE) 802.11 wireless communication protocol, a Bluetooth wireless communication adapter, and an infrared (IR) communication port.

A computer system 400 may also include one or more input devices 411 and one or more output devices 413. Some examples of input devices 411 include a keyboard, mouse, microphone, remote control device, button, joystick, trackball, touchpad, and lightpen. Some examples of output devices 413 include a speaker and a printer. One specific type of output device that is typically included in a computer system 400 is a display device 415. Display devices 415 used with embodiments disclosed herein may utilize any suitable image projection technology, such as liquid crystal display (LCD), light-emitting diode (LED), gas plasma, electroluminescence, or the like. A display controller 417 may also be provided, for converting data 407 stored in the memory 403 into text, graphics, and/or moving images (as appropriate) shown on the display device 415.

The various components of the computer system 400 may be coupled together by one or more buses, which may include a power bus, a control signal bus, a status signal bus, a data bus, etc. For the sake of clarity, the various buses are illustrated in FIG. 7 as a bus system 419.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular datatypes, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   receiving a query including identifiers of datasets and one or more join operators associated with combining data from the datasets;
   generating an operator tree including instructions for processing the one or more join operators, the operator tree including a structure having a join order associated with executing the query;
   applying a plurality of transformation rules to the operator tree to generate an optimized operator tree, wherein applying the plurality of transformation rules applies one or more bitvector filters at different join operators and modifies the join order of the one or more join operators in the optimized operator tree based on a determined impact associated with applying the one or more bitvector filters to the one or more join operators and selecting the one or more bitvectors filters based on the determined impact and different structures of the optimized operator tree; and
   providing the query and the optimized operator tree to an execution engine for processing the query in accordance with the optimized operator tree.

2. The method of claim 1, wherein a structure of the optimized operator tree includes the modified join order generated for an arbitrary query.

3. The method of claim 1, wherein the query includes one or more of a star query structure or a snowflake query structure.

4. The method of claim 3, wherein the structure of the optimized operator tree includes the modified join order of the star query structure or the snowflake query structure with primary-key-foreign-key (PKFK) joins in a plan space of right deep trees without cross products.

5. The method of claim 1, wherein the one or more join operators include one or more of:
   a hash join having instructions for joining two or more datasets from a database including a plurality of datasets identified by the query;
   a merge join having instructions for combining and sorting values from two or more datasets from a database including a plurality of datasets identified by the query; and
   a nested loop join having instructions for using a nested loop to join two or more datasets from a database including a plurality of datasets identified by the query.

6. The method of claim 1, wherein the one or more bitvector filters include one or more of a hash filter, a bloom filter, or variants thereof.

7. The method of claim 1, wherein applying the plurality of transformation rules includes considering the one or more bitvector filters while applying the plurality of transformation rules.

8. The method of claim 7, wherein applying the plurality of transformation rules comprises adding bitvectors to the operator tree during a query optimization process that includes generating the optimized operator tree.

9. The method of claim 1, wherein the method comprises applying the plurality of transformation rules to the operator tree independent of a determined structure of the query.

10. The method of claim 1, further comprising:
generating an additional operator tree including additional instructions for processing the one or more join operators, the additional operator tree having a structure indicating an alternative join order associated with execution of the query; and
wherein providing the optimized operator tree to the execution engine is based on a comparison of a cost of executing the optimized operator tree and the additional operator tree.

11. The method of claim 1, wherein applying the plurality of transformation rules to the operator tree comprises systematically analyzing impacts associated with applying the one or more bitvector filters to a plurality of alternative join orders to determine the modified join order of the one or more join operators having an optimized impact associated with applying the one or more bitvector filters to the one or more join order relative to one or more additional join orders from the plurality of alternative join orders.

12. The method of claim 1, wherein applying the plurality of transformation rules to the operator tree comprises selectively adding bitvector filters to a subset of join operators on the operator tree based on estimated benefits of adding the respective bitvector filters.

13. A system, comprising:
one or more processors;
memory in electronic communication with the one or more processors; and
instructions stored in the memory, the instructions being executable by the one or more processors to:
receive a query including identifiers of datasets and one or more join operators associated with combining data from the datasets;
generate an operator tree including instructions for processing the one or more join operators, the operator tree including a structure having a join order associated with executing the query;
apply a plurality of transformation rules to the operator tree to generate an optimized operator tree, wherein applying the plurality of transformation rules applies one or more bitvector filters at different join operators and modifies the join order of the one or more join operators in the optimized operator tree based on a determined impact associated with applying the one or more bitvector filters to the one or more join operators and selecting the one or more bitvectors filters based on the determined impact and different structures of the optimized operator tree; and
provide the query and the optimized operator tree to an execution engine for processing the query in accordance with the optimized operator tree.

14. The system of claim 13, wherein the query includes one or more of a star query structure or a snowflake query structure.

15. The system of claim 14, wherein the structure of the optimized operator tree includes the modified join order of the star query structure or the snowflake query structure with primary-key-foreign-key (PKFK) joins in the plan space of right deep trees without cross products.

16. The system of claim 13, wherein executing the instructions causes the one or more processors to apply the plurality of transformation rules to the operator tree independent of a determined structure of the query.

17. The system of claim 13, wherein the one or more join operators include one or more of:
a hash join having instructions for joining two or more datasets from a database including a plurality of datasets identified by the query;
a merge join having instructions for combining and sorting values from two or more datasets from a database including a plurality of datasets identified by the query; and
a nested loop join having instructions for using a nested loop to join two or more datasets from a database including a plurality of datasets identified by the query.

18. The system of claim 13, wherein applying the plurality of transformation rules comprises adding bitvectors to the operator tree during a query optimization process that includes generating the optimized operator tree.

19. A non-transitory computer-readable medium storing instructions thereon that, when executed by one or more processors, causes one or more computing devices to:
receive a query including identifiers of datasets and one or more join operators associated with combining data from the datasets;
generate an operator tree including instructions for processing the one or more join operators, the operator tree including a structure having a join order associated with executing the query;
apply a plurality of transformation rules to the operator tree to generate an optimized operator tree, wherein applying the plurality of transformation rules applies one or more bitvector filters at different join operators and modifies the join order of the one or more join operators in the optimized operator tree based on a determined impact associated with applying the one or more bitvector filters to the one or more join operators and selecting the one or more bitvectors filters based on the determined impact and different structures of the optimized operator tree; and
provide the query and the optimized operator tree to an execution engine for processing the query in accordance with the optimized operator tree.

20. The non-transitory computer-readable medium of claim 19, wherein the query includes one or more of a star query structure or a snowflake query structure, and wherein the structure of the optimized operator tree includes the modified join order of the star query structure or the snowflake query structure with primary-key-foreign-key (PKFK) joins in the plan space of right deep trees without cross products.

* * * * *